Figure 1:
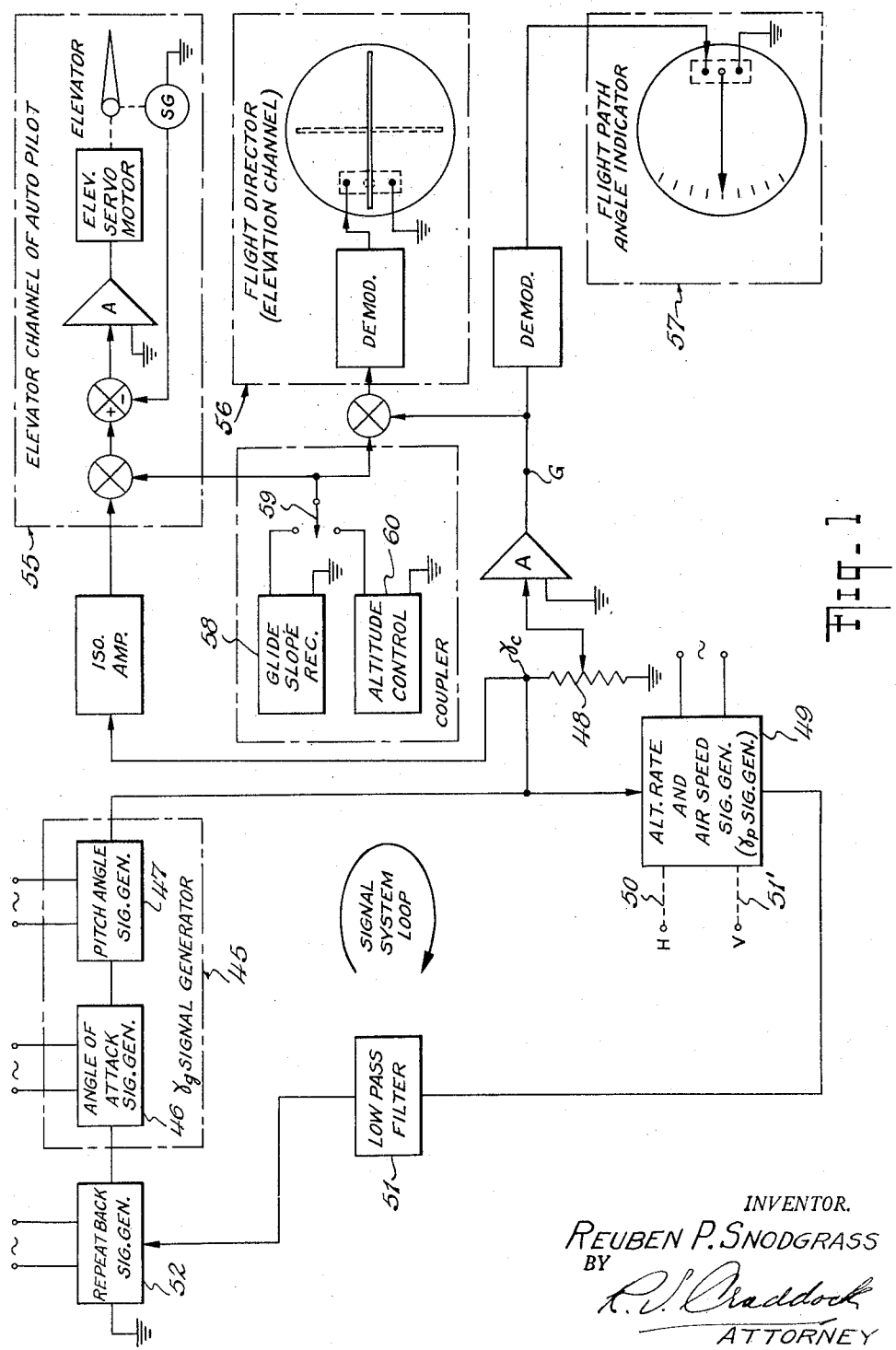

July 21, 1959  R. P. SNODGRASS  2,896,145
FLIGHT PATH ANGLE CONTROL SYSTEMS
Filed March 13, 1956  3 Sheets-Sheet 1

INVENTOR.
REUBEN P. SNODGRASS
BY
*R. J. Craddock*
ATTORNEY

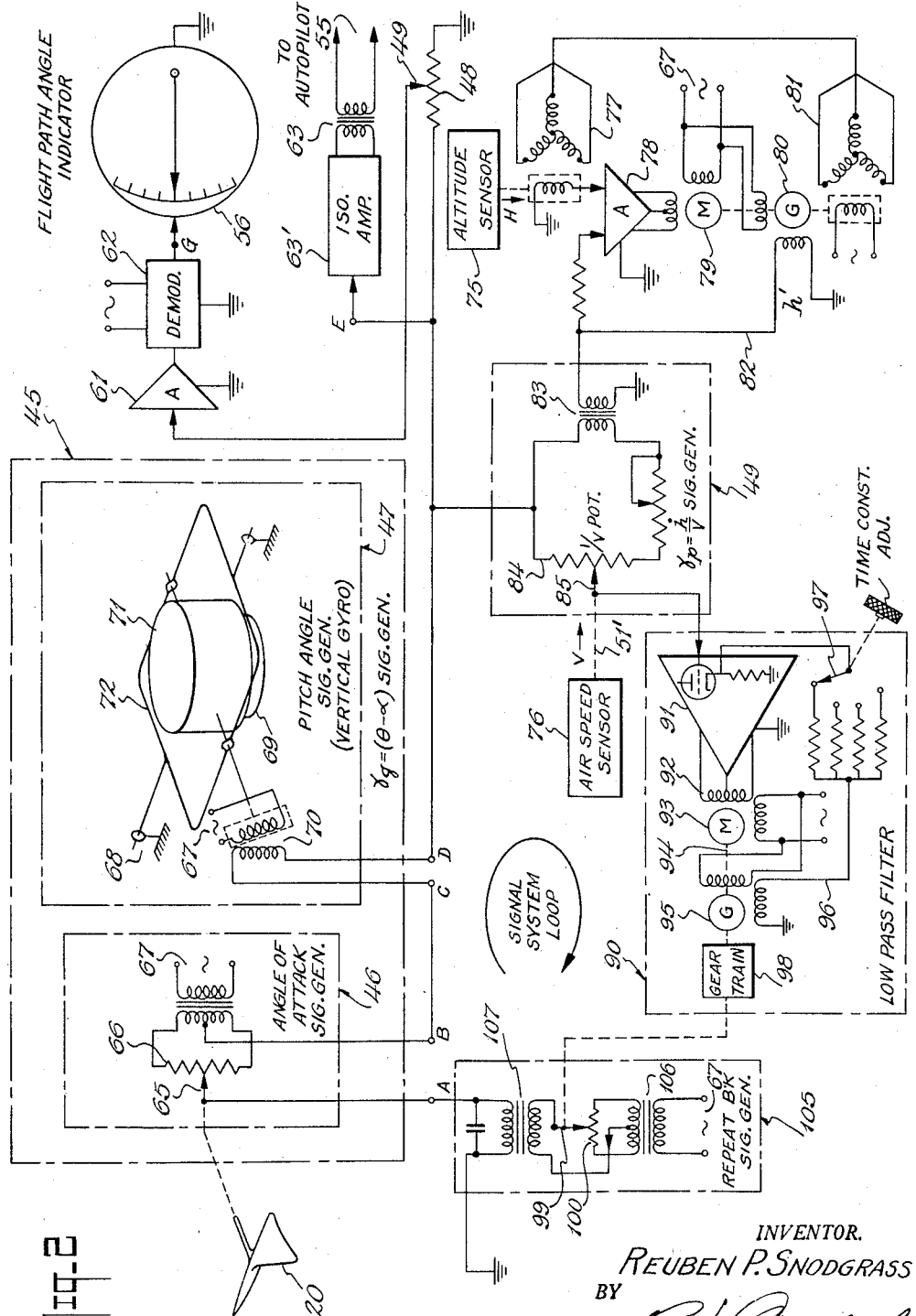

July 21, 1959 R. P. SNODGRASS 2,896,145
FLIGHT PATH ANGLE CONTROL SYSTEMS
Filed March 13, 1956 3 Sheets-Sheet 3
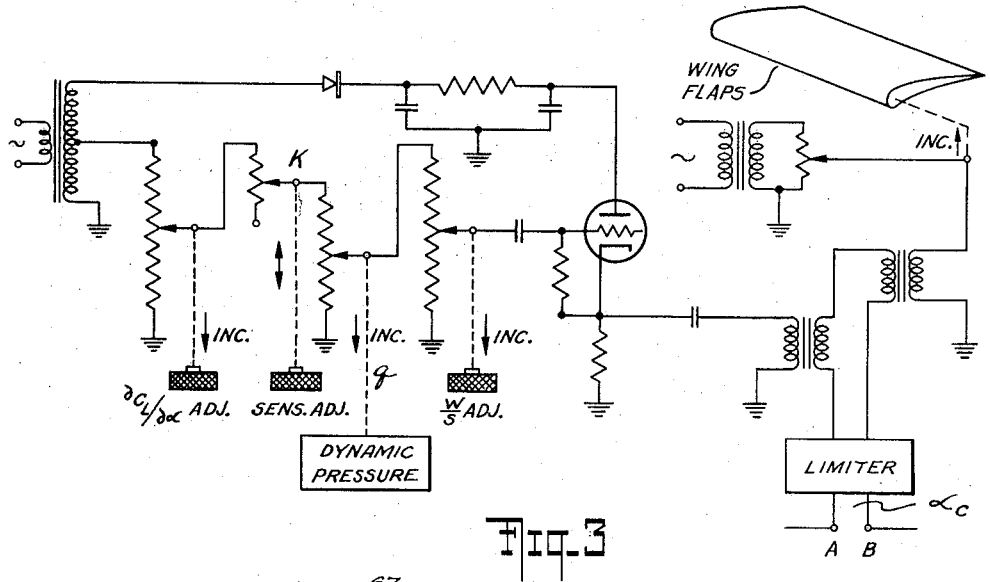
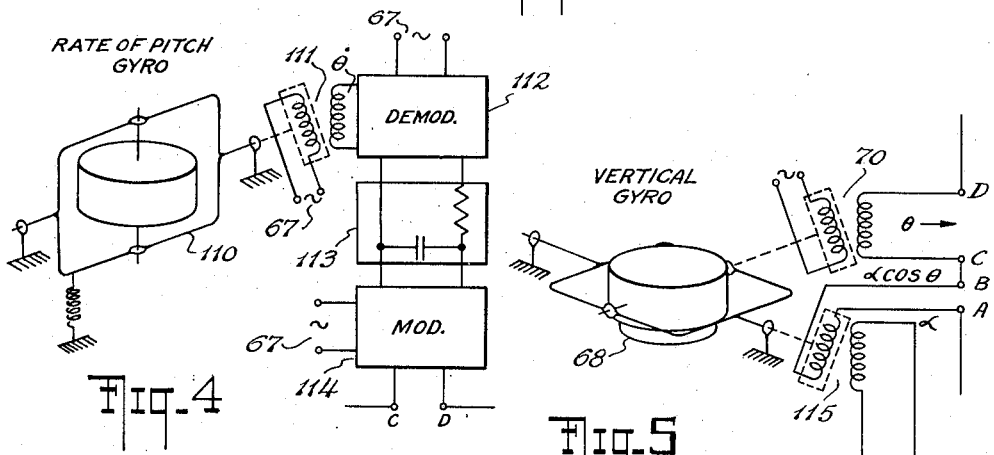
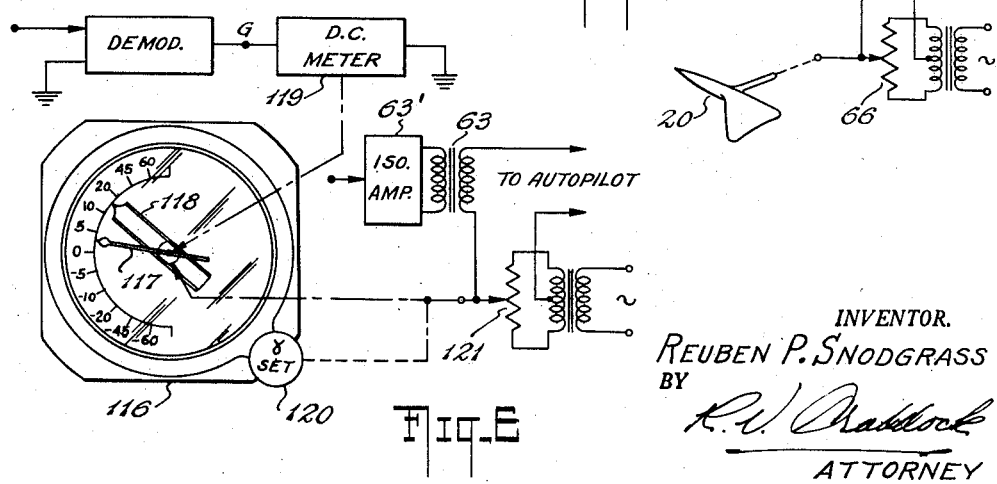
INVENTOR.
REUBEN P. SNODGRASS
BY
ATTORNEY

United States Patent Office 2,896,145
Patented July 21, 1959

2,896,145

FLIGHT PATH ANGLE CONTROL SYSTEMS

Reuben P. Snodgrass, Lake Ronkonkoma, N.Y., assignor to Sperry Rand Corporation, a corporation of Delaware Application March 13, 1956, Serial No. 571,170

14 Claims. (Cl. 318—489)

The present invention relates to apparatus for use in the navigation and control of aircraft, and more particularly, to apparatus for use in the control of aircraft in a vertical plane, that is, for use in controlling the pitch attitude of the craft such that the craft follows a flight path making a desired or selected angle with respect to the horizontal. The apparatus is equally applicable in the automatic control of the aircraft through an automatic pilot, or in the manual control thereof through the use of an indicator indicating the flight path angle directly, or through the use of an indicating instrument of the flight director type such as that disclosed in U.S. Patent 2,613,352 in the name of S. Kellogg 2nd and assigned to the same assignee as the present invention.

Heretofore it has been proposed to control the pitch attitude of the craft so that the path along which the aircraft travels makes a predetermined angle with respect to the geo-horizontal regardless of the craft attitude. Such an angle will hereinafter be referred to as the angle of the craft's flight path or the flight path angle of the aircraft and will be designated generally by the symbol $\gamma$. As is known, the flight path angle may be defined by the algebraic summation of the craft pitch attitude, which will hereinafter be designated by the symbol $\theta$, and the craft angle of attack, which will be hereinafter designated by the symbol $\alpha$, by the following relation $$\gamma = \theta - \alpha \qquad (1)$$

Therefore, in order to control the aircraft to maintain a predetermined flight path angle, measures of angle of attack as well as pitch attitude must be employed. A measure of the pitch attitude of the craft may be obtained from a vertical gyroscope while a measure of the angle of attack of the craft may be obtained from either of two sources: (1) an angle of attack sensor or probe which measures the direction of airflow relative to the aircraft longitudinal axis, or (2) from a computer device which computes angle of attack primarily from a measure of dynamic pressure.

In instances where a vertical gyroscope is employed to determine craft pitch attitude, long period or low frequency errors may develop due to acceleration forces acting on the usually pendulous erection devices which maintain the spin axis of the gyroscope vertical. Such errors may develop during prolonged turns or changes in craft speed or velocity. A further source of error in the vertical gyroscope may result from the erection cycle of the gyroscope, that is to say, an error must exist before the gravity correctors can correct it. Such errors may be small but are nevertheless present and they have a definite amplitude and a relatively low frequency. For this reason, pick-offs or signal generators operated by the vertical gyroscope are generally built with a null-width sufficient to encompass the maximum amplitude of this erection cycle error. It is significant that such errors in the vertical gyroscope output for modern aircraft may result in pitch errors as high as ±2° or more. However, such an inertial reference has excellent response to short-period or high frequency changes in craft attitude and should be maintained as a system reference at these frequencies.

In using an angle of attack sensor of the probe or vane type, wind gusts and/or air turbulence at the location of the probe may cause rapid fluctuations in the angle of attack measure. These rapid fluctuations may be smoothed out by suitable damping at the expense of decreased response. However, like the vertical gyroscope, the vane even when damped has sufficient responses to short period changes in the angle of attack of the aircraft and again should be maintained as a system reference. The above problem is not so severe when angle of attack is computed since such computing devices normally having a settling time which is long enough to be substantially unresponsive to very short period changes in the angle of attack of the aircraft.

Thus, although the measure of flight path angle deriver from inertial sources as described above, hereinafter referred to as $\gamma_g$, is excellent for use in the short period or high frequency control or stabilization of the aircraft, such measure is subject to random long period errors which renders it unsatisfactory for a long period flight path angle reference.

However, another measure of flight path angle is available in the aircraft which does have excellent long period accuracy. Such a measure may be obtained from pressure altitude and air speed since any change in the flight path angle of the aircraft will be reflected in a change of altitude, that is, a rate of climb or dive, the mathematical relation being as follows:

$$\gamma = \sin^{-1}\frac{\dot{h}}{v} \qquad (2)$$

where:

$\gamma$ = flight path angle
$\dot{h}$ = rate of change of altitude or rate of climb or dive
$v$ = craft velocity.

This second measure of flight path angle being derived from air-pressure responsive devices will hereinafter be designated as $\gamma_p$. The latter measure of flight path angle $\gamma_p$, being responsive predominantly only to long period changes in the flight path angle of aircraft, may be employed to correct the flight path angle measure $\gamma_g$ provided by the inertial or gyroscopic devices above referred to. However, this latter source of flight path angle measure also includes undesirable short period or high frequency errors due to random wind gusts and the like.

It is therefore the primary object of the present invention to provide a measure of the flight path angle of the aircraft which has excellent short period response for use in stabilizing the aircraft while at the same time possessing a high degree of accuracy.

It is a further object of the present invention to provide a first measure of flight path angle of the aircraft by means of inertial or attitude responsive devices, and to provide a second measure of the flight path angle by means of pressure-responsive devices which reflect vertical movements of the craft with respect to the horizontal wherein the first measure may be used for short period craft stabilization while the second measure is employed to correct the first measure for any long period drift associated therewith.

It is still a further object of the present invention to provide apparatus of the above character wherein the first measure of flight path angle is corrected in accordance with the low-frequency components of said first and second measures of flight path angle.

It is another object of the present invention to provide apparatus of the above character wherein a short period, highly responsive measure of flight path angle is derived from gyroscopic means for use in stabilizing the aircraft on a desired flight path, and wherein a long period, slow-response measure of flight path angle is derived by means independent of said gyroscopic means for use in correcting any long-period drift associated with said gyroscopic means.

Other objects and advantages of the present invention, not at this time particularly enumerated, will become apparent as the description of preferred embodiments of the invention proceeds, reference being made to the accompanying drawings, wherein Fig. 1 is a schematic block diagram of a preferred embodiment of the invention;

Fig. 2 is a schematic wiring diagram of the embodiment illustrated in Fig. 1;

Figs. 3, 4, 5, and 6 illustrate schematically various modifications of the apparatus of the present invention which are applicable to the apparatus of Figs. 1 and 2 and which have been illustrated as being connectable in such apparatus.

Referring now to Fig. 1 the apparatus of the present invention comprises basically a gyroscopic or inertial-responsive means 45 for providing a first measure $\gamma_g$ of the flight path angle of the aircraft in accordance with Equation 1 above. This measure, being derived from an inertial-responsive device such as a vertical gyroscope, is very sensitive to and therefore responds rapidly to changes in the flight path angle of the aircraft i.e. it has excellent short period or high frequency response. This measure is the primary control term for use in stabilizing the craft at a predetermined path of flight with respect to the geo-horizon. However, this measure is subject to long period drifts such as those produced by the erection cycle error of the gyro vertical, the null width of the signal pick-off employed to generate pitch attitude signals, and to acceleration forces acting on the gravitational erectors therefor, the latter error being the most severe and being present any time the aircraft turns and/or changes speed.

The above long period errors are corrected through the use of a second source 49 of flight path angle measure $\gamma_p$ which is completely independent of the source 45. This latter source is responsive predominantly only to long period or low frequency changes in the flight path angle of the aircraft. Source 49 includes a means responsive to the change in altitude of the aircraft, i.e. its rate of climb or dive. It has been shown by Equation 2 above that this measure of flight path angle is a function of the rate of climb or dive of the aircraft and craft air speed. Inherently, this source of flight path angle is substantially unresponsive to short period changes in flight path angle caused by rapid changes in craft pitch attitude and/or angle of attack but on the other hand provides an excellent measure of sustained changes in flight path angle i.e. the movement or progress of the aircraft in flight with respect to the horizontal.

The output of source 49 is employed to control the output of source 45 by means of a suitable frequency responsive or frequency sensitive means or filter 51. The frequency responsive means 51 is designed to provide an output only upon the occurrence of long period changes in the flight path angle of the aircraft and its output is therefore employed to correct the original flight path angle supplied by source 45 as by means of a repeatback signal generator 52 in a manner to be described. In effect, what the frequency responsive means 51 does is to supplant the pilot in that it observes a flight path angle measure having a high accuracy over long periods, independently of the inertial responsive measure thereof, compares them, and in the event a difference exists, it corrects the value of the flight path angle measure derived from the inertia-responsive means. The system of the present invention thus has the advantages of a gyroscopically controlled source of flight path angle in that the response characteristics are fast and the signal output thereof is stable under transient conditions but also possesses the described advantages of the air-pressure source of flight path angle signal in that it has a very high degree of accuracy in steady state conditions.

In operation of the system as thus for described, suppose the aircraft is being controlled either manually or automatically in accordance with the output of the apparatus of Fig. 1, i.e. the correct or desired flight path angle say, level flight or zero flight path angle, and it is desired to turn to a new heading. As the aircraft turns, turn acceleration errors acting on the gravity erection device for the gyroscopic means will cause the spin axis thereof to be erected to the apparent vertical rather than to the geo-vertial, or earth's vertical, thereby producing a pitch error output from the vertical gyro. However, such an error in the output of the gyroscopic means requires a relatively long time to become significant. The source 45 of Fig. 1 will see this error as an error in the flight path angle and will supply an output requiring a change in the craft's pitch attitude to correct the flight path angle error, that is, will require the craft elevator to be deflected to cause the craft to change its pitch attitude. On the other hand, the pressure-responsive flight path angle source 49 will detect the actual error in the flight path angle produced by the false gyro signal and will serve to correct the output of source 45 by inserting a feedback signal into the gyroscopic system that is equal and opposite to erroneous gyro signal. In effect then the output of flight path angle source 49 changes the reference of the inertial or gyroscopic source 45 of the flight path angle measure $\gamma_g$. Since the error produced in the gyroscopic-responsive source 45 is accumulated relatively slowly and the output of the low frequency responsive means 51 is responsive only to relative slow changes in flight path angle, the gyroscopic error will be cancelled substantially as fast as it is being generated and the craft will continue to fly in such a manner as to maintain its flight path angle at zero or at any desired or selected value. The operation of the system under changing conditions, such as those air speed changes required in an airport approach configuration, is the same as just set forth.

As stated above, the short period flight path angle measure $\gamma_g$ is employed to stabilize the craft against random short period pitching movements thereof, and the long term measure of flight path angle $\gamma_p$ is employed for correcting any long period error generated in the inertial references or gyroscopic means measuring the flight path angle $\gamma_g$. The specific means whereby the latter is accomplished in Fig. 1 includes the technique of connecting the output of the $\gamma_g$ signal generator in series opposition with the $\gamma_p$ signal generator and passing the combined output thereof through a low-pass filter. The output of the filter is connected in feed-back fashion with the $\gamma_g$ signal generator whereby the low frequency or long period signals passed by the low-pass filter are employed to modify the signal produced by the $\gamma_g$ signal generator. The output of the system to the utilization apparatus however, is connected between the $\gamma_g$ and the $\gamma_p$ signal generators. By this technique, the low-pass filter, being connected in feedback fashion with the $\gamma_g$ signal generator, in effect acts as a high-pass filter to the short term or short period $\gamma_g$ signals while at the same time acting as a low-pass filter to any long period errors produced by the $\gamma_g$ measuring devices. A long period reference is maintained by the $\gamma_p$ measuring devices.

Thus, in Fig. 1, the $\gamma_g$ generator 45 includes angle of attack signal generator 46 and pitch angle signal generator 47, the output thereof being applied across voltage divider 48 for use in the utilization apparatus. The $\gamma_p$ signal generator 49, being responsive to altitude and air speed, as indicated at 50 and 51' respectively, is connected in series with the output of $\gamma_g$ signal generator 45 such that the output of the latter includes any low frequency or long-period components of the $\gamma_g$ signal generator as well as the inherently low frequency or long period measures of $\gamma_p$. This output is applied as an input to low-pass filter 51 of any suitable form such as, for example, an electro-mechanical filter or an electronic or RC network. The time constant of low-pass filter 51 is so selected with respect to the natural frequency of the aircraft in pitch that it is unresponsive to short period changes in the pitch attitude of the aircraft. The output of the low-pass filter 51 is employed to actuate a repeat back signal generator 52 connected in series with the $\gamma_g$ signal generator 45. Therefore, in the event of a sustained change in flight path angle of the aircraft caused by either a long period error in the $\gamma_g$ signal generator 45 or by an actual sustained change in the flight path angle as measured by the $\gamma_p$ signal generator 49, the repeat-back signal derived at 52 modifies the $\gamma_g$ signal supplied to the utilization devices in a manner such that the output voltage across the voltage divider 48 includes both the high frequency components of changes in the flight path angle of the aircraft for use in stabilizing the same, and the low frequency components thereof for providing long term accuracy for the system.

As illustrated in Fig. 1, the utilization apparatus for the flight path angle deriving system just described, may include means for automatically controlling the pitch attitude of the aircraft such as an automatic pilot 55 controlling the elevators of the aircraft or the system output may be employed to control the elevator channel of a flight director system 56 of the type disclosed in the above-noted Kellogg patent. On the other hand, the output of the system may simply actuate a flight path angle indicator 57. In either of the former cases, the flight path angle measure provided by the system of the present invention is employed in place of the pitch attitude signal. In other words, flight path angle is the reference to which the aircraft is controlled rather than pitch attitude alone.

The flight path angle signal output of the present invention may be employed in the automatic pilot or flight director systems in combination with other control signals normally used therein. For example, in an automatic approach to an airport, using an instrument landing system, the output of glide slope receiver 58 may be supplied through a suitable selector switch 59 as a command signal to which the flight path angle of the aircraft is referenced through the automatic pilot 55 and/or the flight director 56. In a similar manner, the aircraft may be caused to maintain a desired or selected altitude by means of altitude control 60.

In Fig. 2 there is illustrated in detail the apparatus set forth in general block diagram form in Fig. 1. As shown in Fig. 2, a first measure of the craft's flight path angle is produced by a measure of the craft angle of attack and the craft pitch attitude. Vane 20 is positioned by the direction of air flow relative to the aircraft longitudinal axis, in turn mechanically positions the wiper 65 of potentiometer 66 and thereby generates, from a suitable source of A.-C. voltage 67, a signal voltage having a phase and magnitude dependent, at least in part, upon the angle of attack of the aircraft. A vertical gyro 68 is provided for sensing the pitch attitude of the craft. This gyro is conventional and normally includes some form of gravity erectors 69 such as, for example, liquid levels, pendulus masses, and the like for maintaining the spin axis of its rotor aligned with the gravity vertical. A signal generator device such as, for example, a selsyn or rotary transformer 70 exited from A.-C. source 67, is mounted on the gyro pitch axis such that upon relative rotation between the rotor case 71 and roll gimbal 72, an A.-C. signal having a phase and magnitude dependent upon such rotation is generated. This signal has a value dependent, at least in part, upon the instantaneous pitch attitude of the craft. It will be noted that the angle of attack signal generator 46 and the pitch attitude signal generator 47 outputs are connected in series and the relative phases of the signals are such that they are in opposition, thus satisfying the relation $(\theta - \alpha)$ which by Equation 1 above is equal to the short-period measure of flight path angle $\gamma_g$.

The voltage representing the algebraic summation of angle of attack and pitch attitude, i.e., representing $\gamma_g$ is supplied across voltage divider 48 and a portion thereof, depending upon the setting of variable tap 49, is applied to a preferably infinite impedance utilization device, such as to the grid of an amplifier tube of an indicator amplifier 61. The output of amplifier 61 is demodulated at 62 and is applied as a D.-C. voltage to a suitable indicator 56 for providing the pilot with an indication in the flight path angle of the aircraft. The $\gamma_g$ signal is also applied across the primary of transformer 63 preferably through a conventional isolation amplifier 63' whereby to induce in the secondary thereof a corresponding voltage which in turn is supplied as an input to the pitch or elevator channel of automatic pilot 55 (Fig. 1).

Connected in series with the angle of attack and pitch attitude signal sources 46 and 47, respectively, is the source of long-period flight path angle measure 49. This measure is determined from measures of altitude rate ($\dot{h}$) and craft velocity (V) as derived from an altitude sensor 75 and an air speed sensor 76, respectively. As shown in Fig. 5 a signal proportional to altitude rate is derived from an altitude follow-up servo loop of conventional form comprising an altitude pick-off or selsyn 77 driven directly from sensor 75 by mechanical connection 50 which supplies an altitude error signal to servo amplifier 78. The output of amplifier 78 energizes follow-up motor 79 which drives rate or speed generator 80, and follow-up pick-off or selsyn 81. Selsyn 81 is connected in feedback fashion with pick-off 77 whereby the motor shaft position represents the instantaneous altitude of the aircraft and the speed of rotation of the motor shaft represents the rate of change of altitude. The output of speed generator 80 appearing on lead 82 is an A.-C. signal derived from source 67 having a phase and magnitude dependent upon the rate of change of altitude of the aircraft. This voltage is applied to the input of amplifier 78 to stabilize the altitude follow-up loop in a conventional manner. The altitude rate ($\dot{h}$) signal is also supplied to the primary of transformer 83 for generating in the secondary thereof an A.-C. voltage which varies in accordance with altitude rate ($\dot{h}$). The voltage generated in the secondary of transformer 83 is applied across a potentiometer 84 the wiper 85 of which is positioned in accordance with craft velocity (V) as determined by air speed sensor 76 and mechanical connection 51'. The potentiometer winding 84 and movement of wiper thereon are so designed that the voltage on the wiper 85 varies as a function of the reciprocal of the air speed, thereby satisfying the requirements of the mathematical relation set forth in Equation 2 above, which relation is proportional to the long-period measure of flight path angle $\gamma_p$.

Theoretically, the derivation of the second measure of the flight path angle $\gamma_p$ requires the use of an arc sine computer. However, in practice, the error introduced by using the quotient $$\frac{\dot{h}}{V}$$

directly has a negligible effect in terms of aircraft performance since the sine function is substantially linear over the small normal range of flight path angles encountered in most critical applications, such as maintaining altitude, I.L.S. approaches, landing, taking off and clearing airports, etc.

It will be noted that in addition to the altitude rate voltage applied across potentiometer winding 84 there is also serially connected therewith any voltage generated by the angle of attack signal generator 46 and the pitch attitude signal generator 47 such that between potentiometer wiper 85 and ground there is a voltage which is the series sum of voltages representing the short-period or high frequency flight path angle measure $\gamma_g$ and the long-period or low frequency flight path angle measure $\gamma_p$.

The voltage between wiper 85 and ground is applied to the input of a low-pass filter 90. In the preferred embodiment of the invention the low pass filter is an electro-mechanical filter comprising generally an amplifier, motor, and a speed generator. The output of potentiometer 85 which, as stated above represents the sum of both the $\gamma_g$ and the $\gamma_p$ signals, is applied to the grid of the first input tube of motor amplifier 91 and hence this sum voltage is applied to a substantially infinite impedance load. The output of amplifier 91 is supplied to the control winding 92 of motor 93 whereby to drive motor 93 in accordance with the magnitude and phase of the input signal to the amplifier 91. Rotation of the motor output shaft 94 also drives speed generator 95 the output of which, appearing on lead 96, is fed back to the input of amplifier 91 whereby accurately to control the speed of motor 93 in accordance with the magnitude of the input signal. The time constant of low-pass filter 90 may be varied by selectively varying the magnitude of the speed feedback signal as by means of tap switch 97 in a known manner. A gear train 98 having a very high speed reduction ratio, which further determines the time constant of the filter network 90, is connected between motor 93 and the wiper 99 of potentiometer 100. The potentiometer 100 forms a part of repeatback signal generator 105 and is energized by means of transformer 106 and A.-C. source 67 and serves to supply a reversible phase variable amplitude output voltage proportional to the position of wiper 99 by operation of low-pass filter 90. The repeatback signal thus produced is applied across the primary winding of repeatback transformer 107 the secondary of which is coupled in opposed series circuit with the angle of attack signal ($\alpha$) and the pitch attitude signal ($\theta$).

In effect what the low pass filter does is to supply a feedback signal into the signal loop only upon the occurrence of a persistent or long period change in the flight path angle of the aircraft which feedback signal appears as a corrective signal in the flight path angle measure supplied to the flight path indicator 57, flight director 56, and/or the automatic pilot 55. In other words, with the various signal generators connected as described, the low pass filter acts as a low pass filter to the inherently low frequency changes in flight path angle $\gamma_p$ determined by the air-pressure sensitive devices 75 and 76 and also to any low frequency components of the short-period measure of flight path angle $\gamma_g$ produced by the above described errors inherent in the sensing devices 46 and 47. At the same time the time constant of low pass filter 90 is such that the high frequency or rapid changes in the flight path angle of the aircraft as sensed by devices 46—47 are passed directly to the indicators 56 and 57 of the autopilot 55 for use in stabilizing the craft against these rapid changes. It is believed that the operation of the apparatus disclosed in Fig. 2 is clearly evident from the foregoing discussion and will therefore not be repeated.

Several modifications of the present invention are illustrated in Figs. 3, 4, 5, and 6. The modifications are shown as connectable in the circuit of Fig. 2.

In Fig. 3 there is illustrated apparatus for computing the angle of attack of the aircraft from adjustable quantities representing the slope of the lift curve of the aircraft, the dynamic pressure, the ratio of aircraft weight to wing area, and the deflection of the landing flaps. The mathematical equation relating these quantities is as follows:

$$\alpha_c = K\left[\frac{W/S_n}{\partial c_L/\partial\alpha q} + \alpha_{L_0}\right] \qquad (3)$$

wherein:

$\alpha_{L_0} = (\delta_f)$ = angle of zero lift
$\partial c_L/\partial\alpha$ = slope of lift curve
$W/S$ = wing loading
$n$ = load factor
$q$ = dynamic pressure
$\delta_f$ = flap angle
$K$ = sensitivity constant This angle of attack computer can be adapted to any type of aircraft by proper adjustment of the variables $\partial c_L/\partial\alpha$, $W/S$ and $n$. However, for any particular type of aircraft these values, once set, will remain constant and the computed angle of attack will vary primarily as a function of dynamic pressure $q$ and the angle $\delta_f$ of the landing flaps (load factor $n$ being assumed equal to unity). The sensitivity constant K adjusts the magnitude of the computer output to assure proper matching with the other signals operating in the system. The indicated direction of movement of the various potentiometer wipers are for increasing values of their respective variables. A limiter is provided in the output of the angle of attack computer for insuring that the system operates below stall attitudes and may be of any of a number of different types such as a diode limiter, tube saturation limiter, and the like.

In Fig. 4 the instantaneous pitch attitude or pitch displacement signal may be derived by means of a rate type gyro 110 instead of the displacement type or vertical gyro employed in the aforementioned embodiment. Rate gyro 110 is mounted in the craft so as to be responsive to the rate of pitch of the aircraft and a reversible phase, variable amplitude signal voltage proportional thereto is provided by means of an A.-C. pick-off or synchro transformer 111 energized by A.-C. source 67. The output of pick-off 111 is demodulated as at 112 and integrated by means of an R-C integrating network 113 whereby to provide a D.-C. pitch displacement signal. This D.-C. displacement signal is remodulated at 114 and the resulting A.-C. signal is connected at points C and D of Fig. 2 in place of the vertical gyro derived pitch signal. In the above modification the use of a rate of pitch gyro is possible due to the fact that the inertial devices do not have to supply a long period reference of pitch attitude, the latter being accomplished by means of the pressure-derived source of flight path angle. Such use of a rate of pitch gyro renders the pitch references unaffected by the long period erection errors inherent in displacement type gyro references.

The modification illustrated in Fig. 5 corrects the flight path angle measure $\gamma_g$ for banking of the aircraft. Under banking conditions the true flight path angle may be represented by the following equation $$\gamma_g = \theta - \alpha \cos\phi \qquad (4)$$

wherein $\phi$ is the bank angle of the aircraft. It can be seen that as the bank angle increases from zero to 90° the angle of attack decreases towards zero such that a 90° the flight path angle $\gamma_g$ is equal to the pitch angle $\theta$, angle of attack having no contribution. On the other hand, if the bank angle increases from 90° to 180° (inverted flight) the angle of attack changes sign such that $\gamma_g = \theta + \alpha$. The above compensation is accomplished in Fig. 5 by exciting the stator of a synchro transformer 115, mounted on the roll axis of vertical gyro 68, in accordance with the value of the angle of attack of the aircraft determined by vane 20 or by the computer of Fig 3. The output of the rotor of synchro transformer 115 is therefore equal to ($\alpha \cos\phi$). This compensated angle of attack signal may be substituted for the uncompensated angle of attack signal at points A and B in Fig. 2. Such a correction is probably of little significance in large aircraft of the bomber and transport category where bank angles are relatively low but could be of importance in highly maneuverable fighter aircraft, especially where the aircraft is the platform for fire control equipment.

Fig. 6 discloses a modification of the present invention which greatly facilitates the use by the pilot of the apparatus of the present invention. In this figure there is illustrated a flight path angle selector by means of which the pilot may manually select a desired flight path angle to which the aircraft may be flown by means of the flight director or automatic pilot of Fig. 1. As shown in Fig. 6 the flight path angle selector comprises an indicator dial 116 having suitable calibrated indices thereon representing finite values of flight path angle. Cooperable with these indices are two pointers 117, 118, pointer 117 being actuated in accordance with actual flight path angle and may be displaced by a suitable D.-C. movement 119 energized by the voltage at point G in Fig. 1. The other pointer 118 is mechanically positioned by a knob 120 settable by the pilot to a desired flight path angle. In so setting knob 120 and pointer 118, a potentiometer 121, mechanically coupled with knob 120, generates a voltage proportional to the magnitude of the displacement of pointer 118 from its zero position. The output of potentiometer 121 is applied in series with the actual flight path angle measure supplied to automatic pilot 55 of Fig. 2 through transformer 63. A similar connection may be made to supply the flight path angle command signal so selected to the flight director 56. Thus, a flight path angle command signal is introduced into the system which will be zeroed only when the actual flight path angle as determined by the system is equal to the selector flight path angle.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for accurately determining the angle of the flight path of an aircraft with respect to the horizontal comprising means for supplying a first measure of the flight path angle of the aircraft based in part on the instantaneous attitude of the aircraft with respect to the horizon, said first measure being predominately responsive to rapid changes in the flight path angle of the aircraft, means for supplying a second measure of the flight path angle of the aircraft based on vertical movement of the craft with respect to horizontal movement, said second measure being predominately responsive to slow changes in the flight path angle of the aircraft, frequency-sensitive means responsive to both said measures for deriving an output flight path angle measure including only the predominate frequency components of each of said two measures.

2. Apparatus as set forth in claim 1 wherein the means supplying said first measure includes means for measuring the angle of attack of said aircraft and means for measuring the pitch attitude of said craft with respect to the horizon, and means responsive to said pitch attitude and angle of attack measures for providing an output in accordance with the difference between said measures.

3. Apparatus as set forth in claim 1 wherein the means for supplying said second measure of the flight path angle includes means for providing a measure of the air speed of the craft and means for providing a measure of the rate of change of altitude thereof, and means responsive to said air speed and altitude rate means for providing an output in accordance with the ratio between said measures.

4. Apparatus for accurately determining the angle of the flight path of an aircraft with respect to the horizontal comprising means responsive at least in part to the pitch attitude of the aircraft for supplying a first measure of said flight path angle, said first measure being responsive predominately to the high frequency components of changes in said flight path angle, air pressure responsive means responsive to vertical and horizontal movements of said aircraft in its sustaining air mass for supplying a second measure of the flight path angle of said aircraft, said second measure being responsive predominately only to the low frequency components of changes in said flight path angle, and frequency-responsive means responsive to both said first and second measure for supplying an output measure of said flight path angle including only the predominate frequency components of each of said first and second measures.

5. Apparatus for controlling the angle of the flight path of an aircraft with respect to the horizontal comprising means including means responsive to the attitude of said craft in flight for supplying a first measure of the flight path angle of said aircraft, said first measure being responsive predominately to high frequency changes in said flight path angle but also including erroneous low-frequency components, air pressure responsive means responsive to vertical and horizontal movements of said craft in its sustaining air mass for supplying a second measure of the flight path angle of said aircraft, said second measure being responsive predominately only to the low frequency changes in said flight path angle, frequency-responsive means responsive to both said first and second measures for supplying a third measure of said flight path angle including only the predominate frequency components of both said first and second measures, and means for controlling the attitude of said aircraft in accordance with said third flight path angle measure.

6. Apparatus for determining the angle of the flight path of an aircraft with respect to the horizontal comprising, means including inertia-responsive means for providing a first variable quantity varying predominately with the high frequency changes in the flight path angle of said aircraft but also including erroneous low-frequency variations produced by said inertia-responsive means, air-pressure responsive means for providing a second variable quantity varying predominately only with the low frequency changes in the flight path angle of said aircraft, frequency-responsive means responsive to both of said variable quantities for providing a third variable quantity varying in accordance with the low frequency components of said first and second variable quantities, and means for modifying said first variable quantity in accordance with said third variable quantity.

7. Apparatus as set forth in claim 6 wherein said means including inertia-responsive means comprises means for measuring the angle of attack of said aircraft and gyroscopic means for measuring the pitch attitude of said aircraft.

8. Apparatus as set forth in claim 6 wherein said air-pressure responsive means comprises means responsive to the air-speed and rate of change of altitude of said aircraft.

9. Apparatus as set forth in claim 6, wherein frequency-responsive means for providing said third variable quantity comprises a low pass filter device for passing only the low frequency components of said first and second variable quantities.

10. Apparatus for providing a measure of the flight path angle of an aircraft with respect to the horizontal having high short-period response and stability and long-period accuracy, said apparatus comprising means including attitude-responsive means for providing a first measure of flight path angle including predominantly high frequency components produced by short-period changes in craft attitude and low frequency components produced by long period errors in said attitude responsive means, air-pressure-responsive means including altimeter means for providing a second measure of the flight path angle of said aircraft, said second measure including predominately low frequency components produced by long period changes in aircraft altitude and high-frequency components produced by short period errors in said air pressure responsive means, frequency sensitive means responsive to both of said measures for supplying an output including only the low frequency components of both said measures, and means for modifying said first measure in accordance with said output whereby to correct said first measure for said long period errors.

11. Apparatus as set forth in claim 10 wherein said means including attitude responsive means comprises means for measuring the angle of attack of said aircraft and gyroscopic means for measuring the pitch attitude of said aircraft, and wherein said air-pressure-responsive means comprise means for measuring the air speed and the rate of change of altitude of said aircraft.

12. Apparatus as set forth in claim 11 wherein said gyroscopic means comprising a rate of pitch gyro for providing a signal porportional to the rate of change of pitch attitude of said aircraft and means for integrating said pitch rate signal for providing a measure of the pitch angle of said aircraft.

13. Apparatus for deriving a measure of the flight path angle of an aircraft with respect to the horizon, first means including signal generating means responsive to craft angle of attack and pitch attitude for providing a first signal voltage including both high and low frequency components of changes in the flight path angle of the craft, second means including signal generating means responsive to craft air speed and altitude for providing a second signal voltage including predominately low frequency components of the changes in the flight path angle of said aircraft, a low pass filter, means connecting said first and second signal generator means in circuit with said low pass filter for providing a third signal voltage including only the low frequency components of changes in the flight path angle of said aircraft, means for connecting said third signal voltage in degenerative feedback fashion with said first and second signal generating means, and a utilization device connected to be energized by the voltage between said first and second signal generating means.

14. Apparatus for deriving a measure of the flight path angle of an aircraft means for generating signals in accordance with the angle of attack of the craft, the pitch attitude of the craft, and the air speed and rate of change of altitude of the craft, said angle of attack and pitch attitude signal generating means being responsive predominately to short-period changes in the flight path angle of said aircraft but subject to long-period errors and said air speed and altitude rate signals being responsive predominately only to long period changes in the flight path angle of the aircraft, means including a low pass filter connected to receive all of said signals for generating a feedback signal in accordance with only the long period response of all of said signal generating means, means connecting said feedback signal in series opposition with said angle of attack and attitude signals, and utilization means connected to receive the signal between said angle of attack and attitude signal generating means and said air speed and altitude rate signal generating means whereby said utilization means is responsive to a measure of flight path angle having the high short period response and stability of said angle of attack and pitch attitude signal generating means and a measure of flight path angle having the long period accuracy of said air speed and altitude signal generating means.

References Cited in the file of this patent
UNITED STATES PATENTS
2,701,111    Schuck _____ Feb. 1, 1955